Dec. 10, 1940. H. G. LUMBARD Re. 21,656
CUSHION SOLE SHOE
Original Filed Nov. 6, 1937
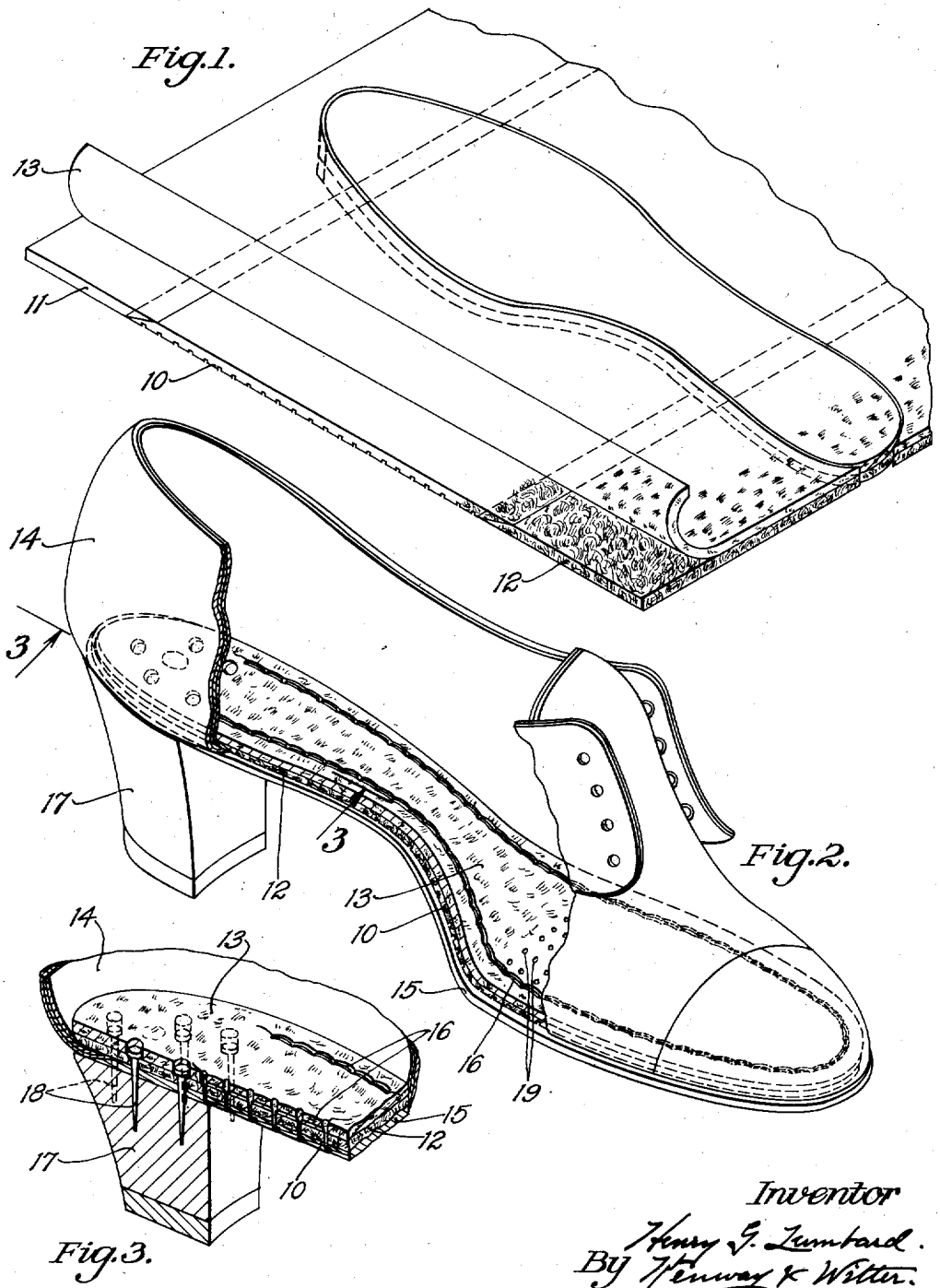
Inventor
Henry G. Lumbard.
By Kenway & Witter.
Attorney Reissued Dec. 10, 1940 Re. 21,656

UNITED STATES PATENT OFFICE 21,656

CUSHION SOLE SHOE

Henry G. Lumbard, Auburn, Maine

Original No. 2,117,183, dated May 10, 1938, Serial No. 173,187, November 6, 1937. Application for reissue August 11, 1939, Serial No. 289,634

4 Claims. (Cl. 36—19)

This invention relates to cushion sole shoes and, in one aspect, comprises a novel shoe structure having a soft resilient surface throughout the bottom beneath the foot of the wearer, the shoe being so constructed as to maintain without distortion or reduction the full measurements of the last. In this important respect the shoe of my invention differs from many cushion shoes heretofore available in which the cushion member is inserted after the last has been withdrawn, in such a fashion as to occupy space which should be reserved for the contour of the wearer's foot.

In another aspect, my invention comprises a novel insole made by uniting permanently in face-to-face contact a continuous layer of soft resilient cushion material, such for example as cork and rubber composition, with a layer of sheet insole material. Any tough and flexible sheet material supplied commercially to the trade for insoles is suitable for the underlying layer or ply of my novel insole. While I do not wish to limit myself to a cork and rubber composition for the cushion layer, this material presents important advantages in that after it has been united to the base material of the insole it may be severely flexed in either direction without ribbing or slipping and consequently it remains perfectly smooth in use. The flexibility of the cushion layer may be further increased or mechanically controlled by providing it with a series of perforations throughout its forepart. By opening or closing in the flexing of the insole these perforations contribute to its flexibility as well as introduce a ventilating action in the shoe bottom.

An important feature of my invention becomes apparent when the cushion insole of my invention is employed in a shoe of the McKay or Littleway type in that it permits the seam to be embedded in the cushion layer and thus entirely free the foot of the wearer from contact with the seam. In fact, if desired, the seam may be drawn entirely through the cushion layer of the insole so that it renders directly upon the tough base layer. A firm tight seam is thus secured without impairing in any respect the soft, flexible, continuous surface contacting with the foot of the wearer.

Similarly the character of the heel seat is improved not only in a shoe of the McKay type, but in any shoe because of the fact that the heel attaching nails may be embedded in the cushion layer. If the shoe carries a wooden heel the heads of the attaching nails may be sunk into the cushion layer in substantial contact with the tough base layer. On the other hand, if the shoe carries a leather heel, the ends of the attaching nails are clenched and similarly embedded in the cushion layer leaving a continuous, soft, resilient surface beneath the heel of the wearer.

The novel insole of my invention may be employed with good advantage in any shoe of the McKay lasted type such as the McKay, Compo or Littleway or in any shoe having a line of stitching normally located beneath the foot of the wearer, or in any other type of shoe where it is desired to provide a continuous resilient cushion immediately under the wearer's foot. In all such shoes a very beneficial cushioning effect is introduced and strong, long-wearing shoe structure achieved without any substantial increase of manufacturing cost.

The features and advantages of my invention will be best understood and appreciated from the following description of a shoe made in accordance therewith selected for purposes of illustration and shown in the accompanying drawing in which Fig. 1 is a view in perspective illustrative of the step of preparing the insole, Fig. 2 is a view in perspective of the complete shoe with portions of the upper broken away, and Fig. 3 is a fragmentary sectional view through the shank and heel part of the shoe.

In preparing the insole of my invention I may employ any tough, flexible sheet material commonly used for such purposes. A suitable and preferred material is shown in Fig. 1 as a composite sheet having a central section of a tough, flexible pulp product with transverse corrugations rolled into its lower face and having edge sections 11 and 12 of somewhat stiffer fibre board. This composite sheet material is available in the market as insole material. To this fibrous underlying ply I unite by cement in continuous face-to-face contact a ply 13 which is flexible, resilient and softer than the underlying ply. This may be any suitable cushion material although I prefer to use a composite sheet of ground cork and rubber, comprising about 70% of cork and about 30% of rubber. This is not only valuable in its cushioning effect but is light, substantially waterproof and highly effective as a heat insulator. The two plies may be permanently and securely united by cement under pressure and having been once securely united may be treated subsequently as a single integral sheet. In Fig. 1 is suggested the step of dieing out from this sheet an insole, the latter being so located in respect to the sheet that the stiff fibre section 12 at one edge of the sheet is cut into the heel seat of the insole, while the shank and forepart includes the more flexible central section 10. Ordinarily the insoles will be cut alternately rights and lefts with the heel seat and toe portions including alternately edge sections 11 and 12 of the underlying ply.

Having prepared the insole as above outlined, it may be incorporated in any type of McKay or cement lasted shoe. It is herein shown as employed in a McKay sewn shoe in which the upper 14 is lasted over upon the margin of the underlying ply 10—12 of the insole leaving the cushion layer 13 extending continuously beneath the foot of the wearer. The outsole 15 is secured to the shoe bottom by a McKay seam 16 of chain stitches which pass through the insole and the body of the outsole 15, being concealed therein in a channel provided for that purpose. As shown in Fig. 3 the stitches are drawn substantially through the cushioning layer 13 of the insole and practically into engagement with the concealed face of the underlying fibre ply of the insole. The flexibility of the shoe bottom is thus improved and the stitches removed entirely from the possibility of contact with the foot of the wearer.

The illustrated shoe is shown as being provided with a wooden heel 17 attached by a group of headed nails driven from inside the shoe into the heel. The heads of these nails are driven substantially through the cushion layer 13 of the insole into engagement with the underlying fibre layer 10, in this way supplying a secure and reliable means of attachment and being entirely removed from contact with the foot of the wearer. It will be apparent that in shoes having leather heels attached by nails driven through the heel and into the heel seat of the sole, the clenched ends of the attaching nails will be similarly embedded in the cushion layer 13 and removed from contact with the foot of the wearer.

The insole employed in the shoe of Fig. 2 is shown as provided with a group of perforations in its forepart within the attaching seam. This is an optional feature and may be employed to increase the flexibility of the shoe bottom and mechanically control it to a certain degree. The perforations are also useful as imparting a ventilating action to the cushion layer when the shoe is worn.

It will thus be seen that, in the illustrated embodiment of my invention I have provided a cushion surface of uniform thickness beneath the entire area of the foot, at the same time shaping the shoe to leave available the full volume of the last. While I have not shown the illustrated shoe as provided with a sock lining, it will be understood that a sock lining will usually be employed in order to improve the appearance of the inside of the shoe. The novel insole not only has all the advantages above mentioned, but has the capacity to resist long wear without disintegration, without buckling or wrinkling beneath the foot and without loss of its cushioning and heat insulating characteristics. As will be apparent the insole is well adapted for use in shoes of the Compo type or in any shoes where an unchanneled insole may be employed. Moreover, while presenting all the advantages enumerated, it makes possible economies in the cost of shoe manufacturing which are of great importance to the manufacturer.

While I have suggested cutting the underlying layer of the insole from sheet material it will be understood that this portion of the insole can be cut to size separately from leather or other sheet material and the cushioned layer then secured to it to form the unit. The insole may be employed with good advantage in McKay, Littleway or cement shoes. It makes no difference how the lasting is done and serves equally well in tack, staple or cement lasted shoes, or in any shoe where an insole may be employed. The perforations shown in the insole need not be limited to the space within the attaching seam, but may be distributed over the entire forepart of the insole if desired without affecting the manufacture of the shoe.

For the sake of appearance a thin, flexible cover layer may be bonded to the surface of the cushion layer thus obviating the necessity of a separate sock lining. When used in a shoe having a stitched bottom the thread would have a tendency to pull through the thin cover down into and in some cases, through the cushion until it engages the harder and tougher underlying layer.

Having thus described my invention, I claim as new and desire to secure by Letters Patent,

1. An improved insole having a tough underlying ply of fibrous material which is flexible throughout the shank and forepart of the sole and stiff throughout its heel seat, and a soft flexible ply of cork and rubber composition extending continuously and homogeneously throughout the entire area of the sole and being united in continuous face-to-face engagement to said underlying ply.

2. An improved cushion insole having a tough underlying ply of fibrous material which is flexible throughout the forepart of the sole and stiff throughout its heel seat and toe portions, and a soft flexible ply of a cork composition extending continuously and homogeneously throughout the entire area of the sole and being united in continuous face-to-face engagement to said underlying fibrous ply.

3. An improved cushion insole having a tough underlying ply of fibrous material which is flexible throughout the forepart of the sole and stiff throughout its heel seat, and a soft flexible ply of cork composition extending continuously and homogeneously in substantially uniform thickness throughout the entire area of the sole and being cemented in continuous face-to-face engagement to said fibrous underlying ply.

4. A cushion sole shoe having an insole comprising a tough underlying ply of fibrous material which is flexible throughout the forepart of the sole and stiff throughout its heel seat, and a soft flexible ply of cork composition extending continuously and homogeneously throughout at least the entire area of the forepart of the sole and being united in continuous face-to-face contact to said underlying ply, and an outsole attached to the shoe bottom by stitches pulled partially through the cork ply and into substantial engagement with the tough underlying ply of the insole.

HENRY G. LUMBARD.